United States Patent [19]

Sakurai et al.

[11] Patent Number: 4,526,921
[45] Date of Patent: Jul. 2, 1985

[54] ACETAL RESIN COMPOSITION

[75] Inventors: Masanori Sakurai; Junichi Miyawaki, both of Osaka; Toshikazu Umemura, Mie; Akiyoshi Shibata, Hyogo, all of Japan

[73] Assignee: Mitsubishi Gas Chemical Company, Inc., Tokyo, Japan

[21] Appl. No.: 586,489

[22] Filed: Mar. 5, 1984

[30] Foreign Application Priority Data

Mar. 3, 1983 [JP] Japan .................................. 58-34803

[51] Int. Cl.³ .......................... C08K 3/38; C08L 59/02
[52] U.S. Cl. ...................................... 524/405; 524/413; 524/420; 524/423; 524/424; 524/430; 524/433; 524/439; 524/440; 524/445; 524/449; 524/537; 525/146; 525/398; 525/413; 525/465
[58] Field of Search ............... 525/398, 413, 465, 146; 524/537, 413, 424, 423, 420, 405, 439, 440

[56] References Cited

U.S. PATENT DOCUMENTS

| | | | |
|---|---|---|---|
| 3,646,159 | 2/1972 | Miller | 524/537 |
| 3,775,363 | 11/1973 | Braunstein | 524/456 |
| 4,130,604 | 12/1978 | Edelman | 525/413 |
| 4,293,469 | 10/1981 | Edelman | 525/398 |

FOREIGN PATENT DOCUMENTS

| | | | |
|---|---|---|---|
| 39-12463 | 7/1964 | Japan | 525/398 |
| 52-3639 | 1/1977 | Japan | 525/398 |

Primary Examiner—Lewis T. Jacobs
Attorney, Agent, or Firm—Sughrue, Mion, Zinn, Macpeak, and Seas

[57] ABSTRACT

An acetal resin composition comprising an acetal resin and a low molecular weight polycarbonate compound having an intrinsic viscosity of 0.2 dl/g or less in methylene chloride at 25° C. and, optionally, an organic or inorganic filler is disclosed. Said composition has improved surface gloss and weather resistance.

18 Claims, No Drawings

ACETAL RESIN COMPOSITION

FIELD OF THE INVENTION

This invention relates to an acetal resin composition or an acetal resin composite material containing an organic or inorganic filler having improved surface gloss and weather resistance.

BACKGROUND OF THE INVENTION

Acetal resins have been employed as substitutes for metals for inner machinery parts, such as gears, bearings, sleeves, shafts, etc., due to their high mechanical strength, hardness, friction and wear resistance, heat resistance, chemical resistance, fatigue properties and the like, and application of the acetal resins to exterior parts of automobiles or electric devices have recently been increased.

Therefore, it has been required for the acetal resins to have further improved weather resistance or surface gloss enough to be used as exterior parts. Further, in order to meet requirements for performances such as improvement in heat resistance or dimensional stability and decreased shrinkage in molding, it has been demanded that the acetal resins be used as composite materials in combination with various fillers.

According to findings so far developed, the acetal resins should be molded by injection using a mold set at a relatively high temperature in order to prevent formation of flow marks on the molded products and to increase surface gloss of the molded products. Molding in a high temperature is, however, disadvantageous in that the molding cycle is long; the molded products have increased shrinkage and increased warpage, etc.

It is known that the acetal resins can be used as composite materials by mixing with organic or inorganic fillers such as glass fibers, glass powders, carbon fibers, potassium titanate fibers, metal carbonates, e.g., calcium carbonate, silica, metal sulfides, polytetrafluoroethylene, carbon black and the like, as disclosed, for example, in U.S. Pat. No. 3,775,363 and Japanese Patent Publication Nos. 28191/69, 25181/70, 25184/70 and 7615/64. However, mere mixing of acetal resins with these fillers often causes problems such as decreased heat stability and decreased mechanical strength.

In order to overcome the above-described problems, an improved process has been proposed in which these organic or inorganic fillers are coated with a phenoxy resin, polyamide, polyurea, polystyrene, polyvinylpyrrolidone, polyurethane, etc., and then mixed with acetal resins. When glass fibers or glass powders are used as fillers, a process of using isocyanates, polycarbodiimides, alkoxymethylmelamines, etc., has also been known, as disclosed, for example, in U.S. Pat. Nos. 3,455,867, 3,647,743 and 4,111,887, GB Pat. Nos. 1,297,458 and 1,331,829, Japanese Patent Publication Nos. 31744/71, 18741/80, 9393/82 and 18383/83, and Japanese Patent Publication (Unexamined) No. 157645/80. However, these known processes are disadvantageous in that the desired effects are not satisfactorily achieved or the composite materials greatly contaminate a mold during injection molding.

Further, although the isocyanates, polycarbodiimides and alkoxymethylmelamines are effective in improving adhesiveness between silane-treated glass fibers or glass powders and acetal resins, no effect is observed in the improvement of adhesiveness between acetal resin and those fillers on which the silane treatment is not effective, such as carbon fibers, carbon black, metal carbonates, metals, tetrafluoroethylene resin and the like.

Furthermore, a large amount of carbon black has conventionally been incorporated into the acetal resins in order to increase weather resistance, but such gives rise to significant reduction in heat resistance and mechanical strength, and cannot provide satisfactory molding materials. In addition, it is difficult to incorporate metal oxides, metal silicates, metal carbonates and the like to acetal resins for imparting a light screening property to the acetal resins.

Thus, the production of composite materials composed of acetal resins and fillers according to conventionally known processes have many problems.

SUMMARY OF THE INVENTION

The present inventors have conducted extensive studies on a process for obtaining a polyacetal resin composition having excellent surface gloss and improved weather resistance without adversely affecting heat resistance, chemical resistance, fatigue properties and friction and wear resistance that are inherent to acetal resins. As a result, it has been found that not only surface gloss but also weather resistance of acetal resin molded products can be improved by incorporating a low molecular weight polycarbonate compound having an intrinsic viscosity of 0.2 dl/g or less (as determined in methylene chloride at 25° C.) into the acetal resin.

It has also been found that the above-described incorporation of the low molecular weight polycarbonate compound produces an excellent adhesion effect upon mixing of the acetal resin with various organic and/or inorganic fillers thereby obtaining an acetal resin composite material having high heat stability and mechanical strength that could not be obtained by the prior art and, thus, reached the present invention.

DETAILED DESCRIPTION OF THE INVENTION

The acetal resin which can be used in the present invention includes an oxymethylene homopolymer substantially composed of an oxymethylene unit that is prepared from a formaldehyde monomer or its cyclic oligomer, such as trimer (trioxan) or tetramer (tetraoxan) and an oxymethylene copolymer composed of an oxymethylene unit and an oxyalkylene unit having two or more carbon atoms that is prepared from the above-enumerated material and a cyclic ether, such as ethylene oxide, propylene oxide, epichlorohydrin, 1,3-dioxolan, 1,3-dioxepan, a formal of glycol, a formal of diglycol, etc.

The low molecular weight polycarbonate compound which can be used in the present invention has an intrinsic viscosity of 0.2 dl/g or less as determined in methylene chloride at 25° C., and includes a polycarbonate compound derived from an aromatic dihydric phenol represented by the formula (I):

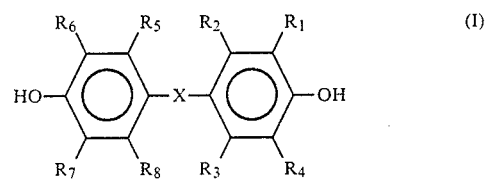

wherein $R_1$ to $R_8$, which may be the same or different, each represents a hydrogen atom, a halogen atom, an alkyl group, a substituted alkyl group or an alkoxy group in which each alkyl moiety has 1 to 6 carbon atoms, and X represents a substituted or unsubstituted alkylene group having 1 to 10 carbon atoms, a sulfonyl group, an oxygen atom or a sulfur atom; a polycarbonate compound derived from an alicyclic hydrocarbon having two hydroxyl groups in its molecule represented by the formula (II):

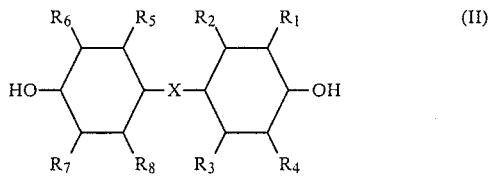

wherein $R_1$ to $R_8$ and X are as defined above; and a polycarbonate compound derived from a mixture of the compound represented by the formula (I) and the compound represented by the formula (II).

In formulae (I) and (II), examples of substituents in the substituted alkyl group include an alkoxy group such as a methoxy group, an acetoxy group, a halogen atom such as chlorine and examples of substituents in the substituted alkylene group include an alkyl group such as a methyl group, an ethyl group, a halogen atom such as chlorine.

The polycarbonate compound additionally includes a polycarbonate compound derived from an acyclic aliphatic hydrocarbon having two hydroxyl groups in its molecule.

Specific examples of the aromatic dihydric phenol of the formula (I) include 2,2-bis(4-hydroxyphenyl)propane, 2,2-bis(4-hydroxy-3,5-dibromophenyl)propane, 2,2-bis(4-hydroxyphenyl)butane, 2,2-bis(3-bromo-4-hydroxyphenyl)propane, 2,2-bis(4-hydroxy-3,5-dimethyl)propane, 4,4'-dihydroxydiphenyl ether, 4,4'-dihydroxydiphenylsulfone, 4,4'-dihydroxydiphenyl sulfide, etc.

Specific examples of the alicyclic hydrocarbon of the formula (II) are 2,2-bis(4-hydroxycyclohexyl)propane, 2,2-bis(4-hydroxy-3,5-dibromocyclohexyl)propane, 2,2-bis(4-hydroxy-3,5-dimethylcyclohexyl)propane, 2,2-bis(4-hydroxycyclohexyl)butane, 4,4'-dihydroxydicyclohexyl ether, 4,4'-dihydroxydicyclohexylsulfone, 4,4'-dihydroxydicyclohexyl sulfide, etc.

Additionally, specific examples of the acyclic aliphatic hydrocarbon are 1,3-propanediol, 1,4-butanediol, 1,6-hexanediol, etc.

The polycarbonate compound can be synthesized by the reaction between the above-enumerated compound and phosgene or a carbonic acid diester, e.g., diphenylcarbonate, dicyclohexylcarbonate.

The reaction can be carried out in a known manner, i.e., by interfacial polymerization using phosgene or interesterification using a carbonic acid diester [c.f. H. Schenell: Angew. Chem., 68, 633 (1956)].

The molecular weight of the polycarbonate compound can generally be controlled by adding phenol and/or an alkyl-substituted phenol, e.g., p-tert-butylphenol, to the polymerization system to block the terminal of the polymer in case of the interfacial polymerization process, or by stopping the reaction at the time when a predetermined molecular weight is obtained in case of the interesterification process.

The polycarbonate compound which can be used in the present invention has a melting point of not more than 240° C. and is melted at a temperature ranging from 180° to 240° C., that is a usual temperature range for molding acetal resins.

The method involving incorporation of the polycarbonate compound into acetal resins is disclosed in Japanese Patent Publication No. 12463/64 and U.S. Pat. No. 4,130,604. However, differing from the low molecular weight polycarbonate compound of the present invention, the polycarbonate resins used in these prior arts have melt viscosities higher than that of the acetal resin in the molding temperature range of from 180° to 240° C., resulting in difficulty in uniformly blending with the acetal resin. Resin compositions not uniformly blended tend to generate flow marks on the surface of the molded products and cause peeling-off of the surface skin layer of the molded products. Therefore, incorporation of these conventional polycarbonates into acetal resins does not show any effect to improve surface gloss of the molded products or to enhance adhesive strength between organic or inorganic fillers and the acetal resins.

The polycarbonate compound which can be used in the present invention exhibits good compatibility with acetal resins and melts at a molding temperature of the acetal resin, more particularly, in a temperature range of from 180° to 240° C., and, when incorporated into the acetal resin, improves the surface appearance of the molded products, i.e., to give excellent surface gloss, to decrease fine roughness and flow marks, and the like. Besides, when fillers are incorporated to acetal resins to produce composite materials, the polycarbonate compound of the invention enhances adhesive strength between the acetal resins and the fillers to provide composite materials having high rigidity.

The mechanism of the above-described increase of adhesive strength has not yet been clarified, but it is believed that such an effect is ascribed to the facts that the acetal resins generally have a large wetting contact angle with organic or inorganic fillers, such as silicates, e.g., glass fibers, glass powders, etc., metals, metal oxides, metal carbonates, metal hydroxides, metal borates, carbon, graphite, polytetrafluoroethylene, polytrifluoroethylene, tetrafluoroethylene copolymers, polyhexafluoropropylene, etc., and that the low molecular weight polycarbonate compounds of the present invention have a small wetting contact angle with these fillers. Thus, it is believed that when the acetal resin in a molten state is solidified, the incorporated polycarbonate compound is not accommodated in the crystal lattice of the acetal resin but is accumulated predominantly on the contact surface of the acetal resin and the fillers thereby enhancing the adhesive strength between the acetal resin and the fillers.

Further, the polycarbonate compound which can be used in the present invention forms a firm skin layer on surfaces of the molded products without bleeding out and, therefore, high friction and wear resistance and chemical resistance inherently possessed by the acetal resins are not adversely affected by the incorporation of the polycarbonate compound. Thus, the resin compositions according to the present invention have many advantages which are not observed in a conventional acetal resin composition.

In particular, when various fillers are mixed with acetal resins to produce composite materials according to the conventional processes, the surface of the filler should be previously treated with a silane treating agent, such as aminosilane, vinylsilane, epoxysilane, etc., an organic titanate, a fatty acid or a fatty acid salt. To the contrary, such a pretreatment of various fillers is not necessarily essential in the present invention. In other words, upon mixing the acetal resin and the fillers, the low molecular weight polycarbonate compound can be merely dry blended therewith, and the resulting mixture can be melt-extruded simultaneously. It is possible, as a matter of course, to use the pretreated fillers as described above in the composite materials of the present invention.

Further, it is also hitherto known that an isocyanate or polycarbodiimide is added as a coupling agent in order to increase adhesive strength of the acetal resin with the fillers, but these coupling agents generally adversely affect the heat stability of the acetal resin and also markedly color the resulting polymer or contaminate a mold.

On the other hand, the composite material of the present invention has extremely excellent heat stability, undergoes little coloration during retention in a mold or causes little contamination of a mold. Further, the incorporation of the low molecular weight polycarbonate compound into the composite material according to the present invention is effectively applicable to those fillers incapable of being treated with a silane treating agent, such as metal carbonates, carbon, graphite, polytetrafluoroethylene, polytrifluoroethylene, tetrafluoroethylene copolymers, polyhexafluoropropylene, etc.

In the production of the acetal resin composite material according to the present invention, it is preferable in some cases to add an amine-substituted triazine compound represented by the formula (III):

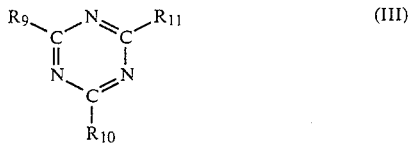

(III)

wherein $R_9$, $R_{10}$ and $R_{11}$ each represents a hydrogen atom, a halogen atom, a hydroxyl group, an alkyl group having 1 to 6 carbon atoms, an alkoxy group having 1 to 6 carbon atoms, an aryl group having 6 to 10 carbon atoms, a hydrogenated aryl group having 6 to 10 carbon atoms, an amino group or a methylolamino group, with at least one of them being an amino group of a methylolamino group, and/or a cyanoguanidine compound represented by the formula (IV):

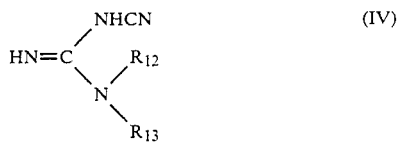

(IV)

wherein $R_{12}$ and $R_{13}$ each represents a hydrogen atom, or an alkyl group, a substituted alkyl group, an alkoxy group or a substituted alkoxy group in which each alkyl moiety has 1 to 6 carbon atoms, to the acetal resin simultaneously with the incorporation of the polycarbonate compound. These compounds of the formulae (III) and (IV), when used in combination with the polycarbonate compound, further increase adhesive strength of the acetal resin to the filler. However, the use of the above-described amine-substituted triazine compound (III) or cyanoguanidine compound (IV) either alone or in admixture thereof does not give rise to the effects contemplated in the present invention.

Specific examples of the amine-substituted triazine compound of the formula (III) include guanamine (i.e., 2,4-diamino-sym-triazine), melamine (i.e., 2,4,6-triamino-sym-triazine), N-butylmelamine, N-phenylmelamine, N,N'-diphenylmelamine, N,N-diallylmelamine, N,N',N''-triphenylmelamine, N-monomethylolmelamine, N,N'-dimethylolmelamine, N,N',N''-trimethylolmelamine, benzoguanamine (e.g., 2,4-diamino-6-phenyl-sym-triazine), 2,4-diamino-6-methyl-sym-triazine, 2,4-diamino-6-butyl-sym-triazine, 2,4-diamino-6-benzyloxy-sym-triazine, 2,4-dioxy-6-amino-sym-triazine (i.e., ammelide), 2-oxy-4,6-diamino-sym-triazine (i.e., ammeline), N,N,N',N'-tetracyanoethylbenzoguanamine and the like, with melamine, guanamine, benzoguanamine, N-monomethylolmelamine, N,N'-dimethylolmelamine, N,N',N''-trimethylolmelamine being particularly preferred.

Specific examples of the cyanoguanidine of the formula (IV) are cyanoguanidine, 1-cyano-3-methylguanidine, 1-cyano-3-ethylguanidine, 1-cyano-3-isopropylguanidine, 1-cyano-3,3-diphenylguanidine, 1-cyano-3-hydroxymethylguanidine, 1-cyano-3-(2-hydroxyethyl)-guanidine and the like. Among them, cyanoguanidine is the most preferred because of its availability.

The inorganic fillers that can be used in the present invention include powderous, flaky or fibrous metals, metal oxides, metal hydroxides, metal sulfates, metal sulfides, metal carbonates, metal silicates including glass fibers or glass powders, metal borates, potassium titanate, carbon or graphite. In particular, the preferred inorganic fillers include glass fibers, glass powders, silica, talc, alumina, mica, clay, dawsonite, montmorillonite, carbon fibers, potassium hexatitanate fibers, zinc oxide, calcium oxide, calcium carbonate, etc. The organic fillers include aromatic polyester fibers, aromatic polyamide fibers, aromatic polyimide fibers, polytetrafluoroethylene, polytrifluoroethylene, tetrafluoroethylene copolymers, polyhexafluoropropylene, etc.

For the purpose of improving surface appearance of the acetal resins, such as for improving surface gloss, decreasing fine roughness or decreasing flow marks, etc., the acetal resin composition according to the present invention comprises 80 to 99.9 parts by weight, preferably 90 to 99.5 parts by weight, of the acetal resin and 0.1 to 20 parts, preferably 0.5 to 10 parts, by weight of the polycarbonate compound based on 100 parts by weight of the composition.

In preparing a composite material composed of the acetal resin and various fillers, the composite material according to the present invention comprises 38 to 99 parts by weight, preferably 60 to 98 parts by weight, of the acetal resin, 1 to 60 parts by weight, preferably 2 to 40 parts by weight, of the organic or inorganic filler, 0.1 to 20 parts by weight, preferably 0.5 to 10 parts by weight, of the low molecular weight polycarbonate compound, and 0.01 to 10 parts by weight, preferably 0.01 to 5 parts by weight, of the amine-substituted triazine compound and/or cyanoguanidine compound based on 100 parts by weight of the composite material.

In preparing an acetal resin from a cyclic oligomer and a cyclic ether as described above, when trioxan or tetraoxan and a cyclic ether and/or cyclic acetal are copolymerized, a crude copolymer having a $-(OCH_2-)_nOH$ group at the end of its molecular chain is obtained. Since this end group is susceptible to so-called zipper decomposition by heating, it is known that the crude polymer is melted to decompose such unstable moiety.

In the present invention, it is possible that the low molecular weight polycarbonate compound and, if necessary, various organic or inorganic fillers and the amine-substituted triazine compound and/or cyanoguanidine compound are mixed during the above-described stabilizing treatment of the crude polymer.

The acetal resin composition or composite material of the present invention may further contain known additives as disclosed in U.S. Pat. No. 4,087,411 such as a thermal stabilizer, e.g., polyvinyl pyrrolidone, hydrazide derivatives, amide compounds, a photo stabilizer, e.g., 2,4-dihydroxybenzophenone, 2-(2'-hydroxy-5'-methylphenol)benzophenone, an antioxidant, e.g., hindered phenols such as 2,6-di-tert-butyl-4-methylphenol, and the like, if desired, as long as these additives do not adversely affect the effects obtained in the present invention.

The acetal resin composition or composite material of the present invention can generally be prepared by mixing total components of the composition or the composite materials in a dry state and the mixture is extruded and mixed all together. Alternatively, two or three of the components are previously mixed and then kneaded with the rest of the components in a molten state. For the production of the composite material, it is particularly preferable that the low molecular weight polycarbonate compound and/or the amine-substituted triazine compound and/or cyanoguanidine compound and the polyacetal resin are first kneaded in a molten state, followed by feeding the filler to the molten blend.

The melt-mixing can be carried out by means of a usual mixing apparatus, such as various extruders, kneaders, a Bumbury's mixer, mixing rolls, etc. The mixing temperature is preferably from 180° C. to 240° C.

The present invention will now be illustrated in greater detail with reference to examples and comparative examples, in which all parts and percentages are by weight unless otherwise indicated.

EXAMPLE 1 AND COMPARATIVE EXAMPLE 1

Preparation of Aromatic Low Molecular Weight Polycarbonate Compound

In a 400 l reaction vessel equipped with a stirrer, a tube for introducing phosgene and a cooling jacket were successively charged 25 kg of a 48% aqueous solution of sodium hydroxide, 250 l of water, 60 l of methylene chloride, 100 g of sodium dithionite and 27.5 kg of 2,2-bis(4-hydroxyphenyl)propane, and 15 kg of phosgene was continuously blown thereinto over a period of 30 minutes while maintaining the temperature of the mixture at 15° to 20° C. to effect the reaction. Thereafter, a solution of 6 kg of a 48% aqueous solution of sodium hydroxide, 100 g of triethylamine and 5.2 kg of p-t-butylphenol in 50 l of methylene chloride was added to the reaction mixture, and the resulting mixture was stirred for 60 minutes.

After completion of the reaction, the reaction mixture was allowed to stand to separate the methylene chloride phase, which was then transferred to a 300 l purification vessel equipped with a stirrer. The methylene chloride phase was washed successively with 100 l of a 1% phosphoric acid aqueous solution and water. The thus purified methylene chloride solution of a low molecular weight polycarbonate compound was transferred to a 500 l solidification vessel and heated together with 300 l of water while stirring to remove the methylene chloride by distillation. After cooling, the residue was filtered and dried to obtain 33.6 kg of an aromatic low molecular weight polycarbonate compound as a powder. The resulting powder had an intrinsic viscosity of 0.13 dl/g as measured in methylene chloride at 25° C., and a number average molecular weight of $2.1 \times 1,000$ and an average degree of polymerization of 7 according to end-group analysis. The resulting product is hereinafter referred to "AL-01".

Preparation of Polyacetal Resin Composition Containing Low Molecular Weight Polycarbonate Compound 200 g of AL-01 obtained above was added to 10 kg of pellets of an acetal copolymer containing 2.8% of a comonomer unit derived from ethylene oxide and having an MI of 9.5 (a trade name Iupital F20-01, manufactured by Mitsubishi Gas Chemical Company, Inc.), and the mixture was heat-kneaded at a resin temperature of 220° C. using a uniaxial extruder having a diameter of 40 mm.

The thus obtained resin composition was subjected to injection molding at a resin temperature of 205° C. and at an injection pressure of 800 kg/cm$^2$ to form a disk having a thickness of 2 mm and a diameter of 10 mm. By varying the mold temperature within a range of from 40° C. to 100° C., the resulting molded products were evaluated for their surface gloss by determining the specular gloss at an incident angle of 60° by use of a glossmeter (GM5 model, manufactured by Murakami Shikisai Kagaku Gijutsu Kenkyusho). The results obtained are shown in Table 1. For comparison, the same procedures were repeated except that the polyacetal resin composition was prepared without using the low molecular weight polycarbonate compound, and the results obtained are also shown in Table 1 as Comparative Example 1.

The molded products obtained from the polyacetal resin compositions containing the low molecular weight polycarbonate compound according to the present invention had very smooth surfaces with only small visible fine roughness or flow marks on their surfaces.

TABLE 1

| Mold Temperature (°C.) | Specular Gloss | |
| --- | --- | --- |
| | Example 1 | Comparative Example 1 |
| 40 | 85.5 | 75.3 |
| 60 | 89.9 | 82.2 |
| 80 | 92.3 | 86.7 |
| 100 | 95.5 | 90.5 |

EXAMPLE 2 AND COMPARATIVE EXAMPLE 2

In a 500 l reaction vessel equipped with a stirrer, a tube for introducing phosgene and a cooling jacket, 47.2 kg of 2,2-bis(4-hydroxycyclohexyl)propane, 50 l of pyridine, 300 l of methylene chloride and 300 ml of water were charged. 19.6 kg of phosgene was continuously fed thereinto over a period of 10 minutes while keeping the mixture at a temperature of 5° to 10° C. The resulting mixture was stirred at 15° to 20° C. for 90 minutes to complete the reaction. The reaction mixture was transferred to a 1.5 m$^3$ vessel, and 700 l of a 10% hydrochloric acid aqueous solution was added thereto over a period of 30 minutes to neutralize the reaction mixture. After allowing the mixture to stand, the separated methylene chloride layer was taken out and washed successively with a 1% aqueous solution of sodium hydrogencarbonate, a 2% aqueous solution of phosphoric acid and water.

The thus purified methylene chloride layer was concentrated in the presence of water to distil off the methylene chloride. After cooling, the residue was filtered and dried to give 52 kg of a powder of an alicyclic low molecular weight polycarbonate compound. The product had an intrinsic viscosity of 0.10 dl/g in methylene chloride at 25° C. and a number average degree of polymerization of 9 according to end-group analysis. The resulting product is hereinafter referred to "CY-01".

Preparation of Polyacetal Resin Composition Containing Low Molecular Weight Polycarbonate Compound 500 g of CY-01 obtained above was mixed with 10 kg of pellets of an acetal homopolymer (a trade name Tenac 5010, manufactured by Asahi Chemical Industry Co., Ltd.), and the resulting mixture was heat-kneaded at an extrusion temperature of 220° C. by the use of a uniaxial extruder having a diameter of 40 mm.

The thus prepared polyacetal resin composition containing the low molecular weight polycarbonate compound was subjected to injection molding at a resin temperature of 205° C., at an injection pressure of 800 kg/cm$^2$, and at a mold temperature of 60° C. to obtain a disk having a thickness of 2 mm and a diameter of 100 mm. The surface gloss of the resulting sample piece was determined in the same manner as in Example 1. Further, the sample piece was immersed in methylene chloride at room temperature for a period indicated in Table 2, and changes of its surface were observed. These results are shown in Table 2. For comparison, a commercially available polycarbonate resin (a trade name Iupilon S-3000, manufactured by Mitsubishi Gas Chemical Company, Inc.; intrinsic viscosity in methylene chloride at 25° C.: 0.49) was mixed with the same acetal copolymer as used in Example 1 at the same proportion, and the mixture was molded under the same conditions as in Example 1. The resulting molded product had a rough surface with a less surface gloss. When this sample piece was immersed in methylene chloride at room temperature, flash scratches generated on the surface and the skin layer was peeled off. These results are also shown in Table 2. The specular gloss was determined in the same manner as described in Example 1.

TABLE 2

| Times for Immersion in Methylene Chloride (25° C.) | Specular Gloss | |
|---|---|---|
| | Example 2 | Comparative Example 2 |
| Before Immersion | 90.5 | 85.4 |
| 10 Days | 90.3 | 70.3 |
| 20 Days | 89.7 | 65.4 |
| 30 Days | 89.9 | 63.3 |

EXAMPLE 3 AND COMPARATIVE EXAMPLE 3

200 g of AL-01 as prepared in Example 1, 30 g of melamine and 250 g of commercially available carbon black (manufactured by Mitsubishi Chemical Industries, Ltd.) were mixed with 10 kg of an acetal copolymer (Iupital F20-01), and the mixture was extrusion-kneaded at a resin temperature of 230° C. using a biaxial extruder having a diameter of 50 mm. The extruded product was injection molded to obtain a sample piece. The sample piece was determined by tensile strength, change in elongation with time passage and generation of cracks by accelerated weather-proofing test by the use of a sunshine weatherometer (WE-SUN-HC model, manufactured by Suga Shikenki KK) under the following conditions:

Black Panel Temperature: About 63° C.
Spray Cycle: 18 mins/120 mins
Sprayed Water: Pure water The results obtained are shown in Table 3. For comparison, the same procedures were repeated but using no AL-01, and the results are also shown in Table 3 as Comparative Example 3.

TABLE 3

| | Example 3 | Comparative Example 3 |
|---|---|---|
| Composition | | |
| Acetal Resin (kg) | 10.0 | 10.0 |
| AL-01 (g) | 200 | — |
| Melamine (g) | 30 | 30 |
| Carbon Black (g) | 250 | 250 |
| Physical Properties | | |
| Tensile Strength (kg/cm$^2$) | | |
| Days for Weather-Proofing Test: | | |
| 0 Day | 624 | 605 |
| 20 Days | 630 | 605 |
| 40 Days | 638 | 600 |
| 80 Days | 628 | 595 |
| Elongation (%) | | |
| Days for Weather-Proofing Test: | | |
| 0 Days | 40 | 35 |
| 20 Days | 35 | 30 |
| 40 Days | 33 | 25 |
| 80 Days | 30 | 21 |
| Generation of Cracks after 80 Days' Testing | None | Very slight |

EXAMPLE 4 AND COMPARATIVE EXAMPLE 4

90 parts of an acetal copolymer (Iupital F20-01) was mixed with 10 parts of a polytetrafluoroethylene resin powder (a trade name Fluon L169, manufactured by Asahi Glass Company, Ltd.), 2 parts of a low molecular weight polycarbonate compound, CY-01, and 0.2 part of methylolmelamine, and the resulting mixture was extrusion-kneaded using a biaxial extruder having a diameter of 50 mm at a resin temperature of 225° C. The resulting extruded product was continuously molded using an injection molding machine of a two-shot, side gate type (PS40E2ASE model, manufactured by Nissei Plastic Industrial Co., Ltd.) at a resin temperature of 210° C., under an injection pressure of 800 kg/cm$^2$, at a mold temperature of 80° C., and with a molding cycle of 6 seconds for injection, 5 seconds for cooling and 2 seconds for interval whereby two disks each having a thickness of 1.5 mm and a diameter of 20 mm were produced. During the continuous molding, contamination of the mold was observed by counting the number of shots until the resin mixture adhered to the core side or the cavity side of the mold. It was found that substantially no adhesion was observed until 15,000 shots.

For comparison, a polyacetal resin composition containing the polytetrafluoroethylene resin powder and having the same composition as above but containing no low molecular weight polycarbonate compound, CY-01, was prepared. When this resin composition was continuously molded under the same conditions as above described, a pale white adhesion was formed on the mold after 2,000 to 2,500 shots and the surfaces of molded products became uneven obviously due to the growing adhesion after 5,000 shots so that the molding was stopped.

The attachment was scraped off and analyzed by infrared spectrophotometry, and was found to be a polytetrafluoroethylene resin. Thus, it can be seen that the low molecular weight polycarbonate compound according to the present invention increases adhesive strength between the polyacetal resin and the polytetrafluoroethylene resin and suppresses contamination of the mold which results from separation of these two components during the molding.

EXAMPLE 5 AND COMPARATIVE EXAMPLE 5

10.0 kg of an acetal copolymer (Iupital F20-01), 3.3 kg of aminosilane-treated glass fiber chopped strands, 250 g of AL-01 and 50 g of melamine were mixed and melt-kneaded using a uniaxial extruder of 40 mm in diameter. The extruded glass fiber-reinforced polyacetal resin was injection-molded and the mechanical strength was determined. Further, in order to examine heat stability, the resin composite material was retained in a heated cylinder of the injection molding machine at a resin temperature of 220° C. for a retention time of 30 minutes, followed by molding into a disk having a thickness of 3 mm and a diameter of 100 mm, and a difference in color was observed by Hunter's Color-Difference Meter. Furthermore, the disk after the retention and the molding was broken into pieces, and the melt index (Ma) was measured. A difference ($\Delta$MI) between Ma and the melt index (Mb) of broken pieces of the disk molded from the resin composite material which had not been subjected to retention in the mold ($\Delta$MI=Ma−Mb) was obtained.

On the other hand, in Comparative Example 5, a glass fiber-reinforced polyacetal resin was prepared in the same manner as above except that AL-01 and melamine were not added but, instead, 170 g of diphenylmethane diisocyanate was used. When the resulting resin mixture was retained in the mold, it underwent remarkable color change into brown (see Table 4).

It can be seen from these results that the glass fiber-reinforced polyacetal resin according to the present invention suffers little color change from retention in the mold and has excellent heat stability.

TABLE 4

|  | Example 5 | Comparative Example 5 |
|---|---|---|
| Composition |  |  |
| Acetal Resin (kg) | 10.0 | 10.0 |
| Glass Fiber (kg) | 3.3 | 3.3 |
| Additive (g) |  |  |
| AL-01 | 250 | — |
| Melamine | 50 | — |
| Diphenylmethane Diisocyanate | — | 170 |
| Mechanical Strength |  |  |
| Tensile Strength (kg/cm$^2$) | 1,243 | 1,150 |
| Bending Strength (kg/cm$^2$) | 1,822 | 1,750 |
| Modulus of Elasticity in Bending (kg/cm$^2$) | 82,000 | 78,000 |
| Test for Retention in Mold |  |  |
| $\Delta$MI | 1.7 | 1.8 |
| Hunter Color Difference |  |  |
| L | 74.7 | 46.3 |
| a | 1.8 | 8.6 |
| b | 7.9 | 21.2 |

EXAMPLE 6 AND COMPARATIVE EXAMPLE 6

Various low molecular weight polycarbonate compounds were prepared in the same manner as described in Examples 1 and 2 using the following starting materials.

TABLE 5

| Polycarbonate Compound | Starting Material | Intrinsic Viscosity of Polycarbonate Compound* ($\eta$) |
|---|---|---|
| AL-02 | 2,2-Bis(4-hydroxyphenyl)butane | 0.02 |
| AL-03 | 2,2-Bis(4-hydroxy-3,5-dibromophenyl)methane:2,2-bis(4-hydroxyphenyl)methane = 2:1 (molar ratio) mixture | 0.10 |
| AL-04 | 2,2-Bis(4-hydroxyphenyl)sulfone | 0.15 |
| CY-02 | 2,2-Bis(4-hydroxycyclohexyl)butane | 0.13 |
| CY-03 | 4,4-Dihydroxydicylohexyl ether | 0.15 |
| CY-04 | 1,6-Hexanediol | 0.08 |

*In methylene chloride at 25° C.

Each of the low molecular weight polycarbonate compounds shown in Table 5 above and cyanoguanidine were mixed in indicated amounts with 10 kg of Iupital F20-01 and 2.5 kg of aminosilane-treated potassium hexatitanate fibers (a trade name TISMO D101, manufactured by Otsuka Chemical Co., Ltd.), and the resulting mixture was melt-kneaded in a uniaxial extruder having a diameter of 40 mm at a resin temperature of 225° C. The resulting potassium hexatitanate fiber-reinforced polyacetal resin was subjected to injection molding, and the tensile strength of the molded product was determined. The results obtained are shown in Table 6. For comparison, the results obtained when no low molecular weight polycarbonate compound was used are also shown in Table 6.

TABLE 6

| Run No. | Low Molecular Weight Polycarbonate Compound | | Amount of Cyanoguznidine (g) | Tensile Strength (kg/cm$^2$) |
|---|---|---|---|---|
| | Kind | Amount (g) | | |
| 1 | AL-02 | 250 | 30 | 936 |
| 2 | AL-03 | 250 | 30 | 925 |
| 3 | AL-04 | 250 | 50 | 915 |
| 4 | CY-02 | 250 | 50 | 942 |
| 5 | CY-03 | 300 | 50 | 897 |
| 6 | CY-04 | 300 | 50 | 885 |
| Comparative Example 6 | None | | 50 | 764 |

EXAMPLE 7 AND COMPARATIVE EXAMPLE 7

A polyacetal resin (Iupital F20-01), AL-01, an amine-substituted triazine compound and an organic or inorganic filler were mixed and extruded in the same manner as in Example 1 to prepare a composite material. The composition and the tensile strength of the resulting composite material are shown in Table 7. In Comparative Example 7, the composite materials were prepared in the same manner but using no AL-01 and amine-substituted triazine compound.

TABLE 7

| | Run No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Example 7 Composition | | | | | | | | | | | | |
| Polyacetal resin (Kg) | 10.0 | 10.0 | 10.0 | 10.0 | 10.0 | 10.0 | 10.0 | 10.0 | 10.0 | 10.0 | 10.0 | 10.0 |
| AL-01 (g) | 200 | 200 | 250 | 250 | 250 | 200 | 350 | 200 | 200 | 200 | 200 | 200 |
| Amine-substituted triazine (g) | Melamine 50 | Benzoguanamine 50 | N,N′—dimethylolmelamine 50 | 1-Cyano-3-ethylguanidine 50 | Melamine 50 | Melamine 50 | Guanamine 50 | Cyanoguanidine 50 | Melamine 50 | Melamine 50 | Melamine 50 | Melamine 50 |
| Filler (Kg) | Carbon fiber 2.5 | Glass powder 3.3 | Calcium carbonate 4.3 | Talc 4.3 | Kaoline 4.3 | Mica 3.3 | Aluminum flakes 2.5 | Zinc oxide 3.3 | Aromatic polyamide[1] 1.1 | Aromatic polyimide[2] 1.1 | Aromatic polyester[3] 1.1 | Polytetrafluoroethylene[4] 1.1 |
| Physical Property | | | | | | | | | | | | |
| Tensile strength (Kg/cm$^2$) | 1508 | 605 | 647 | 620 | 620 | 682 | 495 | 576 | 975 | 775 | 805 | 475 |
| Comparative Example 7 | | | | | | | | | | | | |
| Tensile strength (Kg/cm$^2$) | 957 | 530 | 587 | 477 | 465 | 656 | 385 | 526 | 850 | 680 | 670 | 434 |

Note:
[1] A tradename KEVLAR 29, manufactured by E. I. Du Pont de Nemours & Co. Inc.
[2] A tradename Celanex 2010, manufactured by Celanese Corp.
[3] A tradename Kapton-200F, manufactured by E. I. Du Pont de Nemours & Co. Inc.
[4] A tradename Fluon L169, manufactured by Asahi Glasss Company Ltd.

The filler used in the above examples are as follows.
Carbon Fiber: Polyacrylonitaile (PAN) type chopped strands
Glass Powder: Aminosilane-treated E-glass powder manufactured by Toshiba-Ballotini Co., Ltd.
Aluminum Flakes: K-152 manufactured by Transmet Corporation While the invention has been described in detail and with reference to specific embodiment thereof, it will be apparent to one skilled in the art that various changes and modifications can be made therein with our departing from the spirit and scope thereof.

What is claimed is:

1. An acetal resin composition comprising (a) an acetal resin and (b) a low molecular weight polycarbonate compound having an intrinsic viscosity of 0.2 dl/g or less in methylene chloride at 25° C., wherein said acetal resin is present in an amount of 80 to 99.9 parts by weight and said low molecular weight polycarbonate compound is present in an amount of 0.1 to 20 parts by weight per 100 parts by weight of the composition.

2. An acetal resin composition as claimed in claim 1, wherein said acetal resin is present in an amount of 90 to 99.5 parts by weight and said low molecular weight polycarbonate compound is present in an amount of 0.5 to 10 parts by weight per 100 parts by weight of the composition.

3. An acetal resin composition as claimed in claim 1, wherein said acetal resin is an oxymethylene homopolymer substantially composed of an oxymethylene unit or an oxymethylene copolymer composed of an oxymethylene unit and an oxyalkylene unit having not less than 2 carbon atoms.

4. An acetal resin composition as claimed in claim 1, wherein said polycarbonate compound is a polycarbonate compound derived from an aromatic dihydric phenol represented by the formula (I):

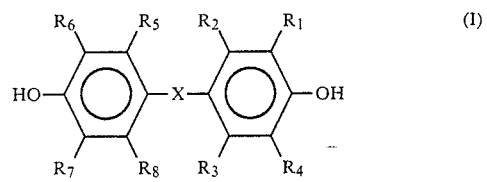

wherein $R_1$, $R_2$, $R_3$, $R_4$, $R_5$, $R_6$, $R_7$ and $R_8$, which may be the same or different, each represents a hydrogen atom, a halogen atom, an alkyl group, a substituted alkyl group or an alkoxy group in which each alkyl moiety has 1 to 6 carbon atoms, and X represents a substituted or unsubstituted alkylene group having 1 to 10 carbon atoms, a sulfonyl group, an oxygen atom or a sulfur atom; or an alicyclic hydrocarbon having two hydroxyl groups in its molecule represented by the formula (II):

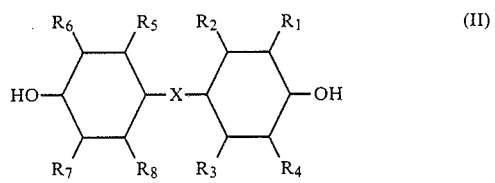

wherein $R_1$, $R_2$, $R_3$, $R_4$, $R_5$, $R_6$, $R_7$, $R_8$ and X are as defined above; or a mixture thereof.

5. An acetal resin composition as claimed in claim 1, wherein said polycarbonate compound is a polycarbonate compound derived from an acyclic aliphatic hydrocarbon having two hydroxyl groups in its molecule.

6. An acetal resin composition as claimed in claim 4, wherein said aromatic dihydric phenol is 2,2-bis(4-hydroxyphenyl)propane, 2,2-bis(4-hydroxy-3,5-dibromophenyl)propane, 2,2-bis(4-hydroxyphenyl)butane, 2,2-bis(3-bromo-4-hydroxyphenyl)propane, 2,2- bis(4-hydroxy-3,5-dimethyl)propane, 4,4'-dihydroxydiphenyl ether, 4,4'-dihydroxydiphenylsulfone or 4,4'-dihydroxydiphenyl sulfide.

7. An acetal resin composition as claimed in claim 4, wherein said alicyclic hydrocarbon is 2,2-bis(4-hydroxycyclohexyl)propane, 2,2-bis(4-hydroxy-3,5-dibromocyclohexyl)propane, 2,2-bis(4-hydroxy-3,5-dimethylcyclohexyl)propane, 2,2-bis(4-hydroxycyclohexyl)butane, 4,4'-dihydroxydicyclohexyl ether, 4,4'-dihydroxydicyclohexylsulfone or 4,4'-dihydroxydicyclohexyl sulfide.

8. An acetal resin composition as claimed in claim 5, wherein said acyclic hydrocarbon is 1,3-propanediol, 1,4-butanediol or 1,6-hexanediol.

9. An acetal resin composition comprising (a) an acetal resin, (b) a low molecular weight polycarbonate compound having an intrinsic viscosity of 0.2 dl/g or less in methylene chloride at 25° C., and (c) an organic or inorganic filler, wherein the acetal resin is present in an amount of 38 to 99 parts by weight, the polycarbonate compound is present in an amount of 0.1 to 20 parts by weight, and said filler is present in an amount of 1 to 60 parts by weight per 100 parts by weight of the composition.

10. An acetal resin composition as claimed in claim 9, wherein the acetal resin is present in an amount of 60 to 98 parts by weight, the polycarbonate compound is present in an amount of 0.5 to 10 parts by weight, and said filler is present in an amount of 2 to 40 parts by weight per 100 parts by weight of the composition.

11. An acetal resin composition as claimed in claim 9, wherein said organic filler is an aromatic polyester fiber, an aromatic polyamide fiber, an aromatic polyimide fiber, polytetrafluoroethylene, polytrifluoroethylene, a tetrafluoroethylene copolymer or polyhexafluoropropylene.

12. An acetal resin composition as claimed in claim 9, wherein said inorganic filler is a flaky or fibrous metal, metal oxide, metal hydroxide, metal sulfate, metal sulfide, metal carbonate, metal silicate, metal borate, potassium titanate, carbon or graphite.

13. An acetal resin composition as claimed in claim 9, wherein said composition further comprises an amine-substituted triazine compound or a cyanoguanidine compound or a mixture thereof, and said amine-substituted triazine compound or a cyanoguanidine compound or a mixture thereof is present in an amount of 0.01 to 10 parts by weight per 100 parts by weight of the composition.

14. An acetal resin composition as claimed in claim 13, wherein said amine-substituted triazine compound or a cyanoguanidine compound or a mixture thereof is present in an amount of 0.01 to 5 parts by weight per 100 parts by weight of the composition.

15. An acetal resin composition as claimed in claim 13, wherein said amine-substituted triazine compound is represented by the formula (III):

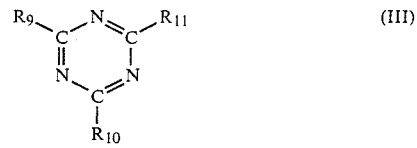

wherein $R_9$, $R_{10}$ and $R_{11}$ each represents a hydrogen atom, a halogen atom, a hydroxyl group, an alkyl group having 1 to 6 carbon atoms, an alkoxy group having 1 to 6 carbon atoms, an aryl group having 6 to 10 carbon atoms, a hydrogenated aryl group having 6 to 10 carbon atoms, an amino group or a methylolamino group, with at least one of them being an amino group or a methylolamino group.

16. An acetal resin composition as claimed in claim 13, wherein said cyanoguanidine compound is represented by the formula (IV):

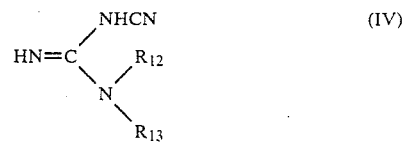

wherein $R_{12}$ and $R_{13}$ each represents a hydrogen atom, or an alkyl group, a substituted alkyl group, an alkoxy group or a substituted alkoxy group in which each alkyl moiety has 1 to 6 carbon atoms.

17. An acetal resin composition as claimed in claim 15, wherein said amine-substituted triazine compound is guanamine, melamine, N-monomethylolmelamine, N,N'-dimethylolmelamine, N,N',N''-trimethylolmelamine or benzoguanamine.

18. An acetal resin composition as claimed in claim 16, wherein said cyanoguanidine compound is cyanoguanamine.

* * * * *